United States Patent [19]

Scheller

[11] Patent Number: 4,715,391

[45] Date of Patent: Dec. 29, 1987

[54] APPARATUS FOR WASHING VEHICLES

[76] Inventor: James I. Scheller, 16742 S. Annette, Oregon City, Oreg. 97045

[21] Appl. No.: 888,736

[22] Filed: Jul. 21, 1986

Related U.S. Application Data

[63] Continuation of Ser. No. 732,349, May 8, 1985, abandoned, which is a continuation of Ser. No. 523,373, Aug. 15, 1983, abandoned.

[51] Int. Cl.$^4$ .............................................. B08B 3/02
[52] U.S. Cl. ............................. 134/57 R; 15/DIG. 2; 134/58 R; 134/82; 134/95; 134/123
[58] Field of Search ....................... 134/18, 27, 28, 29, 134/45, 58 R, 123, 50, 82, 95, 57 R; 15/DIG. 2

[56] References Cited

U.S. PATENT DOCUMENTS

| | | | |
|---|---|---|---|
| 2,801,941 | 8/1957 | Johnson | 134/27 |
| 3,038,481 | 6/1962 | Brechtel | 134/123 |
| 3,370,596 | 2/1968 | Daum et al. | 134/58 R |
| 3,651,830 | 3/1972 | Kollmai | 134/45 |
| 3,724,472 | 4/1973 | Jenkins | 134/123 |

Primary Examiner—Richard V. Fisher
Assistant Examiner—W. Gary Jones
Attorney, Agent, or Firm—Eugene M. Eckelman

[57] ABSTRACT

An arch-like body member includes conduit means and is of a dimension to allow a vehicle to move therethrough. The arch is associated with acidic and alkaline detergent supplies as well as a rinse, and controls are provided to sequentially apply the acidic detergent, the alkaline detergent, and the rinse. The system may also employ three arches having respective association with the acidic detergent supply, the alkaline detergent supply, and the rinse.

1 Claim, 4 Drawing Figures

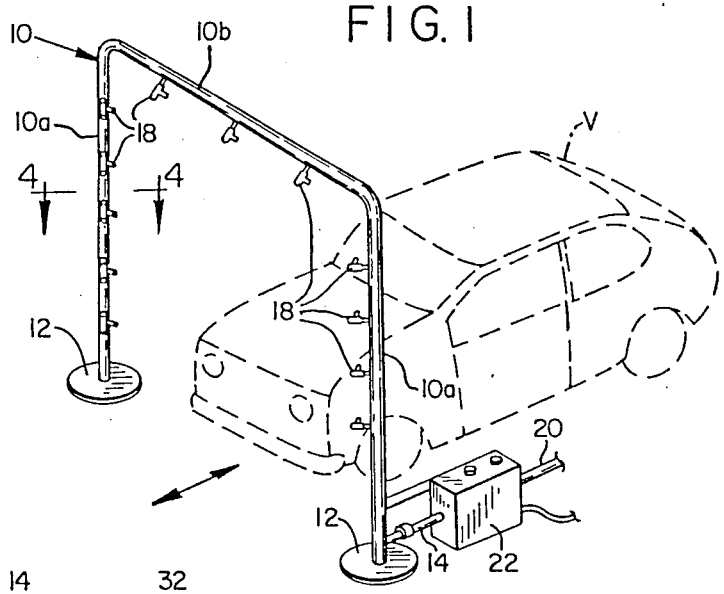
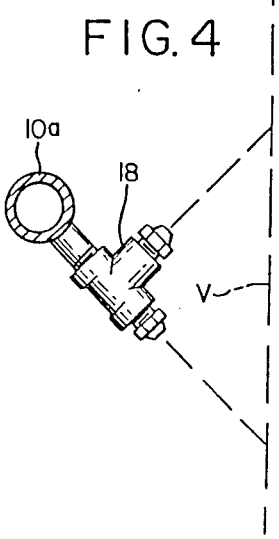
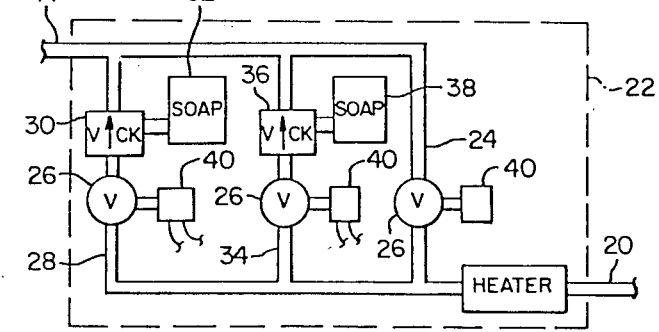
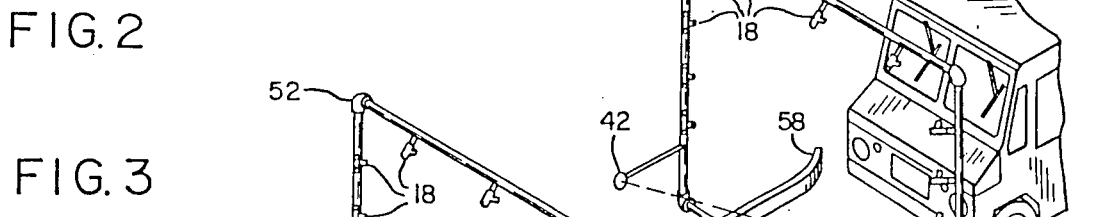
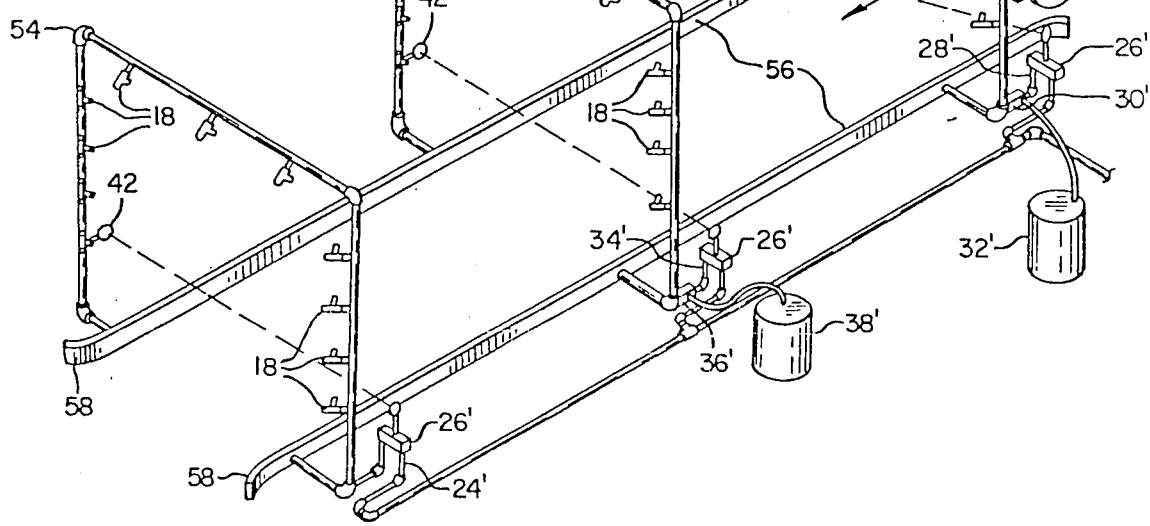

APPARATUS FOR WASHING VEHICLES

This application is a continuation, of application Ser. No. 732,349, filed 5/8/85, now abandoned, in turn a continuation of Ser. No. 523,373, filed 8/15/83, now abandoned.

BACKGROUND OF THE INVENTION

This invention relates to new and useful improvements in methods and apparatuses for washing vehicles.

Various types of apparatus are on the market for washing vehicles. Such apparatuses utilize large rotating brushes or other movable members for removing dirt from the vehicle. The equipment used in these apparatuses is complex and expensive and most of the systems are intended only for mass cleaning in commercial operations. In other words, it would not be feasible for the householder or the average small business to have such equipment for washing their cars or trucks since it is more convenient to utilize the services of the commercial establishments. The equipment used in prior apparatuses also has the disadvantage that it frequently damages portions of the vehicle such as chrome trim, antennas, mirrors, paint, etc.

SUMMARY OF THE INVENTION

According to the present invention and forming a primary objective thereof, method and apparatus for washing vehicles are provided which utilize simplified structure and operation and which are capable of economically and functionally being used by the householder or by small businesses, or further yet by commercial car wash establishments. Another object of the invention is to provide apparatus of the type described which does not damage the vehicle.

In carrying out the objectives of the invention, the apparatus of the invention comprises an arch-like body member of dimensions which allow a vehicle to move therethrough. This body member includes conduit means and spray nozzles and furthermore is associated with first and second detergent means arranged to dispense acidic and alkaline detergents in sequence. The apparatus also includes rinsing means. Control means are provided between a pressured liquid supply means and each of the two detergent means and the rinse means for sequentially operating these three functions. The control means include solenoid operated valves and actuating means therefor which may comprise manually operable transmitter and receiver means or automatically operable sensing means such as electric eye means. The detergent means includes containers and suction valves of a structure which dispense detergent upon pressured flow of liquid in the supply means. The apparatus may include a single arch associated with two detergent supply means and a rinse and also including control means for operating the detergent supply and rinse through common nozzles on the arch, or the apparatus may include three arches with the arches associated with respective ones of the first detergent means, the second detergent means, and the rinse means. In accordance with a method of the invention, a vehicle using the single arch is moved forward and backward and then forward again to receive the three steps of cleaning. In the three arch structure, the vehicle moves forwardly only.

The invention will be better understood and additional objects and advantages will become apparent from the following description taken in connection with the accompanying drawings.

BRIEF DESCRIPTION OF THE DRAWINGS

FIG. 1 is a perspective view of apparatus of the invention utilizing a single arch;

FIG. 2 is a diagrammatic view of liquid supply and control means for the structure of FIG. 1;

FIG. 3 is a perspective view of the apparatus of the invention utilizing three arches; and FIG. 4 is an enlarged sectional view taken on the line 4—4 of FIG. 1.

DETAILED DESCRIPTION OF PREFERRED EMBODIMENTS

With reference first to FIG. 1, a single arch apparatus is illustrated comprising a U-shaped body member 10 constructed of suitable conduit and having a pair of leg portions 10a and a connecting top 10b. This U-shaped structure is open at the bottom and has suitable upright support, such as on disc-type feet 12. An inlet conduit 14 is connected into the body member 10 and is arranged to supply the body member with water from a pressure supply system such as a public water system or special system. The dimensions of the body member 10 are such that vehicles V are arranged to be driven therethrough. The legs 10a and top 10b of the body member are provided with nozzles 18 suitably constructed, such as V-shaped, to direct a spray to all desired surfaces of the vehicle in a well-known manner. A typical nozzle 18 is shown in FIG. 4.

The conduit 14 is connected to a pressured water supply 20 through an intermediate detergent or soap supply and control portion 22 illustrated diagrammatically in FIG. 2. Control portion 22 comprises a first supply path 24, comprising a rinse, between the conduit 14 and the supply 20. This path includes a solenoid operated valve 26 therein. A second supply path 28 is provided between conduit 14 and supply 20 and also has a solenoid operated valve 26 therein. This latter path includes a suction valve 30 associated with a container 32 for liquid detergent or soap. Suction valve 30 is of a well-known construction which causes detergent to be drawn from the container when pressured flow exists in the line but which shuts off the flow upon the termination of pressure and prevents backflow. Valves of this type are known in the trade as Dema valves. Detergent container 32 is provided with an acidic detergent. The acidity of the detergent is preferably in the range of from 5 to 2 pH.

A third supply path 34 is provided between the conduit 14 and the water supply 20. This path likewise has a solenoid operated valve 26 therein, and similar to the path 28, has a suction valve 36 associated with a container 38 for a liquid detergent or soap. Valve 36 operates the same as valve 30 in that it will supply detergent to the line when there is pressured flow in the line in the one direction. Detergent container 38 is provided with an alkaline detergent preferably in the range of from 10 to 13 pH.

All three of the solenoid valves 26 are associated with electrical control means 40. Such control means preferably comprise receivers arranged to be energized by a manually operable radio controlled mechanism which can be operated by the operator from inside the vehicle. Such control means are of well-known structure such that operation of the transmitter provides signals which actuate the valves in a sequence comprising first the path 28, then the path 34 and then the path 24 whereby the acidic detergent is first applied, then the alkaline detergent, and then the rinse.

In the method of use of the arch 10, the acidic detergent supply is initiated as the vehicle is driven into the arch. After the vehicle is moved fully through the arch it is then driven in reverse through the arch and the control system is actuated by the operator to initiate the alkaline detergent supply. Thereupon, the vehicle is again driven forward through the arch and the control system is actuated by the operator to initiate the rinse.

The sizes of the nozzles and pressure supply are selective to provide the desired cleaning action. The acidic detergent cleans the surface of the vehicle and the alkaline detergent further cleans but also neutralizes the surface. The rinse comprises clear tap water.

With reference to FIG. 3, the invention can comprise a three arch system comprising a first body member 50, a second body member 52, and a third body member 54. These U-shaped arches similarly have nozzles 18 as in the first embodiment and may be suitably supported such as by side rails 56 with flared ends 58. The control mechanism with the acidic and alkaline detergents and with the rinse are identical to that described in connection with FIGS. 1 and 2 except that these functions are located at and associated with respective ones of the arches 50, 52 and 54. In this second embodiment, the numerals 26' represent the solenoid operated valves, and the numerals 30' and 36' represent the suction valves of arches 50 and 52, respectively. This embodiment similarly employs paths 28', 34', and 24' for the two detergent means and the rinse. The numerals 32' and 38' represent the acidic and alkaline detergent containers associated with the paths 28' and 34', respectively.

The operation of the system is the same as in the FIG. 1 embodiment except that the vehicle is driven straight through. The control means 40 may be operated by a transmitter in the vehicle as described in connection with the FIG. 1 embodiment, or preferably, electric eye means 42 may be provided on the arches for operating the control means 40 of the valves 26' in the proper sequence for applying the acidic detergent, the alkaline detergent, and then the rinse as the vehicle moves slowly through all three arches.

According to the present invention, a washing system is provided which is of low cost to manufacture, it is easily installed, and it is feasible for use by private individuals, by businesses that wash their vehicles, or by commercial car wash systems. With proper nozzle arrangement, substantially every portion of the vehicle surface is reached. The spray of the system does not damage any portion of the vehicle, as opposed to large spinning brushes and the like which often tear off antennas, mirrors, or other parts. The apparatus has a low cost maintenance and can be easily moved to other locations. It is also inexpensive to operate. Furthermore, the present system does not require a building in which to be housed unless desired. The system can accommodate any size vehicle, including large cars or trucks.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described my invention, I claim:

1. Apparatus for washing vehicles in a streak-free process, consisting essentially of
   first, second and third arch-like body members each having top and side portions of height and width dimensions allowing a vehicle to move therethrough,
   support and quide means secured to said arches to support them upright and also to guide a vehicle through the arches,
   said three arches being spaced apart and in alignment with each other so that a vehicle can be driven therethrough,
   conduit means and inwardly directed nozzles on the top and side portions of each arch,
   first detergent means associated with said conduit means and nozzles of said first arch supplying an acidic detergent to said nozzles of said first arch in a pH range of 2 to 5 for initial washing of a vehicle,
   second detergent means associated with said conduit means and nozzles of said second arch supplying an alkaline detergent to said nozzles of said second arch in a pH range of 10 to 13 for further washing a vehicle and neutralizing said acidic detergent,
   water rinse means associated with said conduit means of said third arch supplying pressured water in a final step to said nozzles of said third arch for rinsing the detergents from the vehicle,
   containers for each of said first and second detergent means having communication with said conduit means and nozzles,
   electrically operated valved control means in said conduit means arranged to be energized at selected positions of a vehicle for sequential operation of said first detergent means, said second detergent means, and said water rinse means,
   pressure means associated with said conduit means for pressurizing said first and second detergent means and rinse means,
   and actuating means for said electrically operated valved control means.

* * * * *